United States Patent [19]

Kwon et al.

[11] 4,349,775
[45] Sep. 14, 1982

[54] TEMPERATURE COMPENSATED VOLTAGE REGULATOR FOR PHOTOVOLTAIC CHARGING SYSTEMS

[75] Inventors: Yiduk Kwon, Bedford; Paul Lawson, Hopedale, both of Mass.

[73] Assignee: Exxon Research & Engineering Co., Florham Park, N.J.

[21] Appl. No.: 222,053

[22] Filed: Jan. 2, 1981

[51] Int. Cl.$^3$ .............................. G05F 1/46; H02J 7/04
[52] U.S. Cl. ........................................ 320/35; 320/39; 323/281; 323/906; 323/907
[58] Field of Search ...................... 320/35, 36, 39, 40; 323/906, 907, 281

[56] References Cited

U.S. PATENT DOCUMENTS

| | | | |
|---|---|---|---|
| 3,736,489 | 5/1973 | Mullersman | 320/35 |
| 3,895,283 | 7/1975 | Peterson | 320/36 X |
| 4,105,962 | 8/1978 | Scott, Jr. et al. | 320/35 X |
| 4,220,908 | 9/1980 | Nicol | 320/35 X |
| 4,298,835 | 11/1981 | Rowe | 323/281 |

Primary Examiner—Robert J. Hickey
Attorney, Agent, or Firm—Paul E. Purwin; Robert S. Salzman

[57] ABSTRACT

A voltage regulator for use in photovoltaic charging of storage batteries includes a temperature compensated reference voltage. The circuitry of the invention permits fixed temperature coefficient and variable temperature coefficient temperature compensated regulation.

The voltage regulator comprises an operational amplifier including a linearly temperature dependent current source coupled to an input terminal of said operational amplifier and a voltage source having a selectable voltage which is connected to another input of said operational amplifier, said reference voltage circuit being operable to provide a reference voltage about equal to a maximum charging voltage for said batteries;

a comparator for comparing said reference voltage with an output voltage of said photovoltaic array; and a switch responsive to said comparator to inhibit charging whenever said array output exceeds said reference voltage.

6 Claims, 4 Drawing Figures

TEMPERATURE COMPENSATED VOLTAGE REGULATOR FOR PHOTOVOLTAIC CHARGING SYSTEMS

BACKGROUND OF THE INVENTION

The present invention relates generally to voltage regulators and in particular to a temperature compensated voltage regulator for photovoltaic solar cell charging systems.

The voltage of a fully charged battery varies with its temperature, being a higher value at lower temperatures. The normal full-charge voltage of 14.4 volts (12 volt lead-acid battery) is only "correct" at a battery temperature of 25° C. Temperature compensation is generally employed in sophisticated battery charging systems. The need for such a feature increases when temperature extremes are anticipated or where battery charging requirements become particularly dependent upon narrow changes in the battery temperature. In a conventional lead-acid cell, the charging characteristics are not significantly altered by small temperature changes, however, the important characteristics such as the maximum charging voltage, referred to in the art as finish voltage is temperature related. As the battery temperature is increased, the battery electrolyte expands resulting in a lower specific gravity. This change is equal to about 1 point (0.001) in specific gravity for every 3° F. change in temperature. The battery temperature also affects the diffusion rate of the electrolyte and the internal resistance of the cell. These factors combine to influence the cell's electrical capacity and correspondingly affect the charging characteristics and correspondingly affect the charging characteristics of the battery. Exceeding the finished voltage, that is exceeding the full charge voltage, results in electrolyte gassing and its depletion. This, in turn, will result in battery deterioration. Gassing will occur at relatively small levels of over charging potential. These problems are typically avoided by providing a charging regulator circuit which compensates the maximum or finish voltage in response to the battery or ambient temperature. This feature is particularly emphasized in remote area applications where the storage batteries are not readily subject to inspection or, as mentioned heretofore, in applications where extreme temperature fluctuations are anticipated. A prime example of these conditions occur in space applications. In U.S. Pat. No. 3,740,636, for example, a temperature responsive portion of the charging regulator shunts the photovoltaic charging power from the storage batteries when a preselected maximum temperature is achieved.

Further applications which stress the importance of the temperature compensated charging regulation are charging systems for storage batteries which have peculiar temperature dependencies. One such storage battery is the nickel cadmium system. An exemplary charging system of a nickel cadmium battery may be found in U.S. Pat. No. 3,940,679. The primary concern of these systems is thermal runaway, a characteristic of nickel cadmium batteries. When the temperature of a nickel cadmium battery exceeds about 160° F., the battery voltage decreases, permitting increased charging current to be drawn, in turn heating the battery further. A temperature responsive cut-off switch is conventionally employed in these systems. The present inventions would be operative to avoid the charging problems encountered in such thermal runaway systems not by temperature over-ride means, however, but by automatically adjusting the regulator's reference potential in response to a monitored temperature change. A voltage regulation of photovoltaic solar cell charging of storage batteries differs from constant current or constant voltage charging of same inasmuch as a photovoltaic solar cell array is subject to wide variances in power output, dependent upon solar insolance. The photovoltaic array/battery system is designed based upon average insulation values. The charging system is accordingly subject to wide variances in both current and voltage. A conventional regulator for a photovoltaic system would be primarily directed to prevention of over voltage charging of the storage batteries. In contrast to such systems, the present invention provides for temperature compensation of the maximum charging voltage providing increased protection of the storage battery systems.

SUMMARY OF THE INVENTION

The present invention teaches a voltage regulator for use in photovoltaic charging of storage batteries which includes a temperature compensated reference voltage. A relatively simple circuit comprising a temperature controlled impedance in conjunction with a biased current-to-voltage converting operational amplifier provides a simple yet effective temperature compensated voltage reference for voltage regulation, particularly adapted to photovoltaic solar cell charging systems.

DETAILED DESCRIPTION OF THE INVENTION

Figure 1:
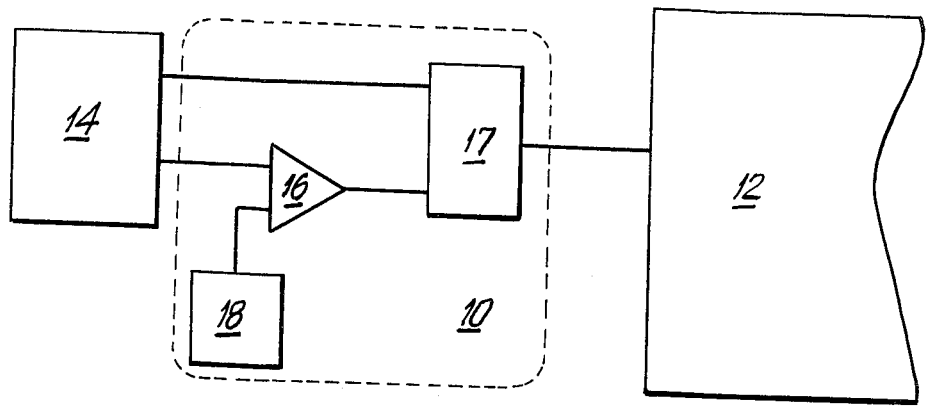
FIG. 1 illustrates, in block diagram format, the functional components of the present invention.

Referring to FIG. 1, voltage regulator means collectively designated 10 is interposed between solar photovoltaic array 12 and storage batteries 14. The regulator means generally comprises comparator means 16, switching means 17 and reference voltage means 18. In an alternate embodiment, a proportional regulator may be substituted for the switching regulator described hereinafter. Described in functional format, comparator means 16 is coupled to monitor the battery terminal voltage and compare this voltage to the reference voltage provided by reference means 18. Switching means 17 is responsive to a differential signal provided by the comparator means. Switching means 17 is operative to include or remove the charging power provided by the photovoltaic solar cell array 12. More particularly, regulator 10 operates to prevent over potential charging of the storage batteries by the photovoltaic array. In one embodiment, the voltage regulator 10, with the exception of the voltage reference means 18, comprises the regulator set forth in the applicant's copending application U.S. Ser. No. 202,454, Filed Oct. 21, 1980, which is herein incorporated by reference.

Figure 2:
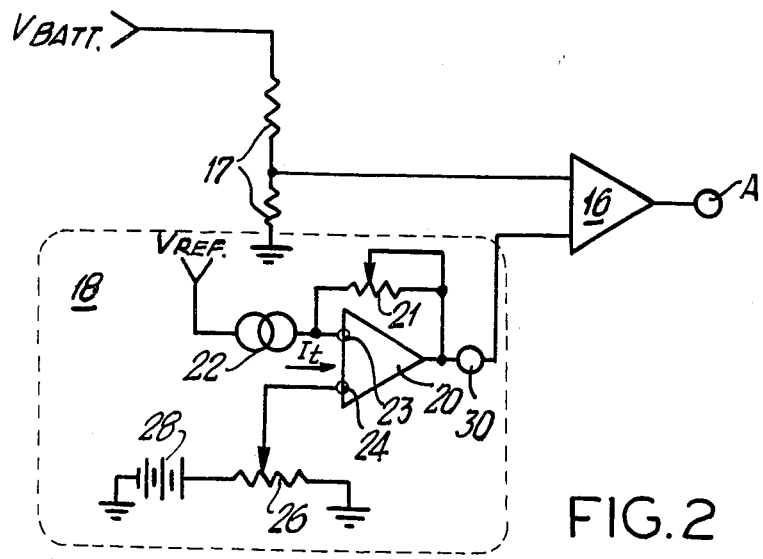
FIG. 2 illustrates, in schematic form, one circuit embodiment of the present invention.
Figure 3A:
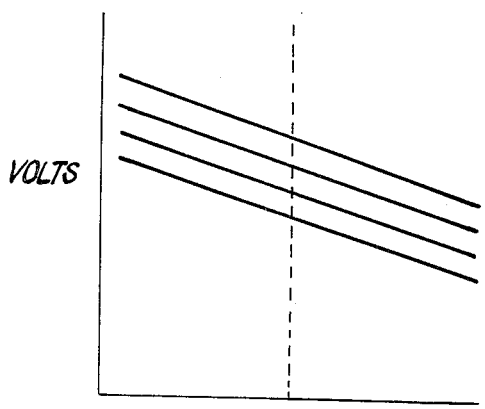
FIGS. 3A and 3B illustrate, in graphic format, the temperature dependencies of the reference voltage provided by the present invention.

A circuit schematic of one embodiment of the reference voltage means 18 is shown in FIG. 2. The reference voltage circuitry generally includes an operational amplifier 20, which is arranged to function as a biased current-to-voltage converter, having a variable resistor 21 coupled between input terminal 23 and output terminal of the operational amplifier. A temperature responsive current source 22 provides a linearly temperature dependent variable current between voltage source $V_r$ and input terminal 24. This circuit arrangement provides a linearly temperature dependent current $I_t$ to one input terminal of the operational amplifier. The operational amplifier 20 functions to convert this temperature dependent current $I_t$ into a temperature dependent voltage. The remaining input terminal 24 of the operational amplifier is coupled through a variable resistor 26 to a constant voltage source 28, providing a variable voltage to the biasing input of the operational amplifier. This voltage, in turn, biases the linear temperature dependent voltage discussed heretofore. The resultant reference voltage at terminal A is illustrated in FIGS. 3A and 3B.

Two variations of temperature compensation circuit are contemplated by the invention, fixed temperature coefficient and variable temperature coefficient regulation. The "temperature coefficient" is the rate at which the full-charge voltage varies with battery temperature. This rate is typically specified in millivolts per °C. per battery cell. Two common values are $-3$ mV/°C./cell and $-5$ mV/°C./cell. For a 12 volt battery (6 cells), these values become $-18$ mV/°C. and $-30$ mV/°C. respectively. For example, the variation of full charge voltage with temperature of a 12 volt battery is plotted in the graph of FIG. 3A. The variable bias voltage aspect of the present invention facilitates ready adjustment of the regulator to suit the specified maximum charging voltages of a given storage battery while retaining the temperature compensation aspect of the present invention.

Figure 3B:
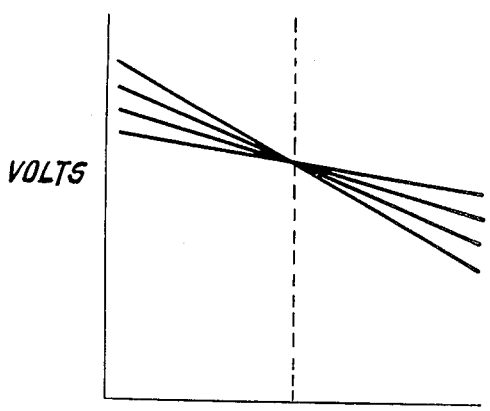

Referring to FIG. 3B, a variation in the slope (change in volts/change in temperature) of the voltage temperature curve is achieved by varying resistance value of variable resistor 21.

The variable temperature coefficient version may contain a trimpot for example, which allows the temperature coefficient to be adjusted to any desired value, i.e. between $-1$ mV/°C./cell and $-8.5$ mV/°C./cell. In the fixed temperature coefficient version this trimpot is replaced by a fixed resistor. The temperature coefficient is therefore fixed at a predetermined value ($-5$ mV/°C./cell). This, in conjunction with the biasing capability discussed heretofore, provides approximate preprogrammed temperature compensation for the particular characteristics of a storage battery. That is, for a given storage battery, the temperature dependent changes in the specific gravity and diffusion constants can be compensated by varying both the bias voltage $V_b$ and slope, altering resistor 21.

The temperature compensated reference voltage is coupled into one input of comparator means 16; a second input of comparator 16 monitors the battery terminal voltage, comparing this voltage to the reference voltage. The differential between these two voltages is used to trigger further components of the regulator circuitry. These further components, collectively illustrated in FIG. 1 as 17, are responsive to a predetermined positive or negative differential signal to either include or remove the photovoltaic charging power from the storage batteries.

To further assist one skilled in the art, the following example details a specific embodiment of the present invention.

EXAMPLE 1

A temperature compensated voltage regulator was constructed to control the photovoltaic solar cell charging of lead-acid type storage batteries. The solar cell panel had an anticipated maximum output of about 15 volts at room temperature which exceeded the finish voltage or maximum charging voltage of the 12 V lead-acid storage batteries. A voltage regulator, substantially similar to that described in copending application U.S. Ser. No. 202,454, was interposed between the solar panel and the storage batteries. The regulator circuitry as taught in that invention was modified as taught herein to provide a temperature compensated reference voltage. The specifications for the 12 volt lead-acid batteries recommended a maximum charging voltage of about 14.4 volts, at room temperature (25° C.) above which appreciable electrolyte gassing would be anticipated. A temperature compensation of about $-33$ millivolts/°C. was also specified for the 12 V lead-acid storage batteries.

Referring to FIG. 2 of the drawings which schematically illustrates the temperature compensated voltage reference circuitry, for 12 V battery typically the positive input terminal of comparator means 16, 723 regulator IC with built-in operational amplifier and voltage reference was coupled to the positive terminal of the storage batteries through a five-to-one resistor divider network 17. The negative terminal of the comparator was coupled to receive the temperature compensated reference voltage. A National Semiconductor type LM 124 or Motorola type MC 3503 operational amplifier (op-amp) selected for converter means 20, was arranged as a voltage biased current-to-voltage converter. An Analog Device type AD590 linear temperature transducer, shown in FIG. 2 as temperature responsive impedance 22, was coupled between the negative input terminal to op-amp 20 and the positive terminal of the storage batteries, the latter serving as a voltage source greater than about 4 volts. For supply voltages between 4 volts and 30 volts, the transducer served as a high impedance constant current regulator, passing an output current which was linearly proportional to the absolute temperature at a rate of about $1\mu A/°K.$ ($273+°$ C.). A precision variable resistor 21 was coupled between the negative input terminal and the output terminal of op-amp 20. The positive input terminal of op-amp 20 was coupled through precision variable resistor 26 to a type 723 regulator IC voltage reference, used to supply a variable bias voltage of up to about 7.0 volts typically to the positive terminal of op-amp 20. Thus arranged, the circuit provided a temperature dependent linearly variable voltage whose slope and voltage intercept, as shown in FIGS. 3a and 3b, could be varied to suit the charging characteristics of the storage batteries.

For testing purposes, a high impedance voltmeter was connected to terminal 30 to monitor the output of the reference voltage section during the adjustment and calibration procedures described hereinafter. A current source, initially set to provide 298$\mu$A, (the 25° C. output of device AD 590) was substituted for the temperature transducer 22. To establish the room temperature maximum charging voltage, the resistance value of R26 was then set by adjusting potentiometer 26 until the voltage monitored at terminal 30 was 1/5 the specified maximum charge voltage of 14.4 volts. The temperature compensation characteristics was then programmed by altering the slope of the temperature versus voltage curve. The test and calibration circuitry was then switched out of the circuit providing a preprogrammed linear temperature compensated voltage reference source having a room temperature maximum charging voltage of 14.4 volts and a linear temperature compensation of about −33 millivolts/°C., the specified charging characteristics of the lead-acid battery used.

What is claimed is:

1. A regulator system for controlling photovoltaic charging of primary batteries, said system comprising:

storage batteries having a room temperature full charge voltage $V_{normal}$, said voltage being temperature dependent;

a photovoltaic array having an output voltage capable of exceeding $V_{normal}$, said array being coupled to provide charging power to said batteries;

regulator means interposed between said array and said batteries, said regulator means including comparator means for comparing battery voltage to a reference voltage;

reference voltage means capable of providing a reference voltage about equal to the temperature dependent charge voltage $V_{normal}$, said reference means including an operational amplifier, arranged to provide biased current to voltage conversion, having a temperature dependent current source coupled to one input of said amplifier and a second voltage source having a predetermined voltage level coupled to a second input to said operational amplifier whereby said reference means provides a linearly temperature dependent reference voltage to said comparator means.

2. The regulator system of claim 1 wherein said temperature dependent current source is a linearly temperature dependent current source.

3. The regulator system of claim 2 wherein said linearly proportional current is about one microamp per degree K.

4. The regulator system of claim 1 wherein said batteries comprise lead acid storage batteries having a room temperature full charge voltage of about 2.3 volts/cell.

5. The regulator system of claim 1 wherein said reference voltage means further includes means for preselecting a value for room temperature normal full charge voltage, $V_{normal}$, and means for preselecting a voltage to temperature dependency.

6. A temperature compensated regulator for controlling a photovoltaic array charging of primary storage batteries, said regulator comprising:

reference voltage means having an operational amplifier including a linearly temperature dependent current source coupled to an input terminal of said operational amplifier and a voltage source having a selectable voltage which is connected to another input of said operational amplifier, said reference voltage means being operable to provide a reference voltage about equal to a maximum charging voltage for said batteries;

comparator means for comprising said reference voltage with an output voltage of said photovoltaic array; and switching means, responsive to said comparator means to inhibit charging whenever said array output exceeds said reference voltage.

* * * * *